United States Patent
Fröberg Olsson et al.

(10) Patent No.: US 10,361,831 B2
(45) Date of Patent: Jul. 23, 2019

(54) WIRELESS DEVICE AND METHOD FOR SELECTING UPLINK TRANSMISSION PARAMETERS

(71) Applicant: Telefonaktiebolaget L M Ericsson (publ), Stockholm (SE)

(72) Inventors: Jonas Fröberg Olsson, Ljungsbro (SE); Martin Hessler, Linköping (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1167 days.

(21) Appl. No.: 14/116,030

(22) PCT Filed: Jun. 26, 2013

(86) PCT No.: PCT/SE2013/050767
§ 371 (c)(1),
(2) Date: Nov. 6, 2013

(87) PCT Pub. No.: WO2014/171869
PCT Pub. Date: Oct. 23, 2014

(65) Prior Publication Data
US 2014/0307643 A1   Oct. 16, 2014

Related U.S. Application Data

(60) Provisional application No. 61/812,446, filed on Apr. 16, 2013.

(51) Int. Cl.
*H04W 4/00*    (2018.01)
*H04L 5/00*    (2006.01)

(52) U.S. Cl.
CPC ................ *H04L 5/0053* (2013.01)

(58) Field of Classification Search
CPC .......... H04W 72/042; H04W 72/0453; H04W 76/023; H04W 72/0406; H04W 88/08;
(Continued)

(56) References Cited

U.S. PATENT DOCUMENTS

2011/0038271 A1*  2/2011  Shin ................ H04W 52/08
                                                  370/252
2011/0134774 A1*  6/2011  Pelletier ............. H04W 52/365
                                                  370/252
(Continued)

FOREIGN PATENT DOCUMENTS

WO   2008153367 A1   12/2008
WO   2010105255 A2    9/2010
WO   2013047129 A1    4/2013

*Primary Examiner* — Atique Ahmed
(74) *Attorney, Agent, or Firm* — Sage Patent Group

(57) ABSTRACT

The present invention relates to a method for selecting a set of uplink transmission parameters. The method is performed in a wireless device of a radio communications system. The method comprises obtaining information mapping resources of a physical downlink control channel region to at least two sets of uplink transmission parameters. The method also comprises receiving a downlink control message on a resource of the physical downlink control channel region, and selecting a set among the at least two sets of uplink transmission parameters. The selection of set is based on the resource of the physical downlink control channel region on which the downlink control message is received, and on the obtained information mapping resources of the physical downlink control channel region to the at least two sets of uplink transmission parameters.

12 Claims, 4 Drawing Sheets

(58) Field of Classification Search
CPC ..... H04W 24/02; H04W 24/08; H04W 24/10; H04L 41/12; H04L 5/0053
USPC .................................................. 370/329, 241
See application file for complete search history.

(56) References Cited

U.S. PATENT DOCUMENTS

| | | | |
|---|---|---|---|
| 2011/0243066 A1* | 10/2011 | Nayeb Nazar | H04L 1/007 370/328 |
| 2012/0281646 A1* | 11/2012 | Liao et al. | 370/329 |
| 2013/0034073 A1* | 2/2013 | Aiba | H04L 1/0026 370/329 |
| 2013/0051369 A1* | 2/2013 | Ko | H04B 7/0413 370/335 |
| 2013/0114528 A1* | 5/2013 | Chen et al. | 370/329 |
| 2013/0194931 A1* | 8/2013 | Lee | H04L 5/0053 370/241 |
| 2014/0036789 A1* | 2/2014 | Miao et al. | 370/329 |
| 2014/0211673 A1* | 7/2014 | Lu et al. | 370/311 |
| 2014/0321406 A1* | 10/2014 | Marinier | H04B 7/024 370/329 |
| 2014/0376479 A1* | 12/2014 | Imamura | H04L 5/001 370/329 |
| 2015/0043468 A1* | 2/2015 | Seo | 370/329 |

* cited by examiner

WIRELESS DEVICE AND METHOD FOR SELECTING UPLINK TRANSMISSION PARAMETERS

TECHNICAL FIELD

The disclosure relates to a wireless device and a radio network node of a radio communications system. It also relates to a method performed by the radio network node for controlling a selection of a set of uplink transmission parameters by the wireless device, and to a method performed by the wireless device for selecting uplink transmission parameter sets.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a User Equipment (UE) is wirelessly connected to a Radio Base Station (RBS) commonly referred to as an evolved NodeB (eNodeB) in LTE. An RBS is a general term for a radio network node capable of transmitting radio signals to a UE and receiving signals transmitted by a UE. The eNodeB is a logical node in LTE and the RBS is a typical example of a physical implementation of an eNodeB. More generally, a UE may be referred to as a wireless device.

FIG. 1 illustrates a radio access network in an LTE system. An eNodeB 101a serves a UE 103 located within the RBS's geographical area of service or cell 105a. The eNodeB 101a is directly connected to the core network. The eNodeB 101a is also connected via an X2 interface to a neighboring eNB 101b serving another cell 105b.

LTE Coordinated Multipoint (CoMP) is a facility that is being developed for LTE Advanced. LTE CoMP transmission and reception refers to a wide range of techniques that enable dynamic coordination or transmission and reception with multiple geographically separated eNodeBs. Its aim is to enhance the overall system performance, utilize the resources more effectively, and improve the end user service quality. The techniques used for CoMP are very different for the uplink (UL) and downlink (DL). This results from the fact that the eNodeBs are in a network connected to other eNodeBs, whereas the handsets or UEs are individual wireless devices.

One fundamental property of DL CoMP, that is expected to be relevant also for the evolution of LTE in Rel-12, is the possibility to transmit different signals and/or channels from different geographical locations or Transmission Points (TP) to the same UE. Correspondingly, in UL CoMP signals transmitted by a certain UE may be received and decoded at different reception point(s) (RP) than those associated to DL transmissions.

One of the principles guiding the design of the LTE system is transparency of the network to the UE. In other words, the UE is able to demodulate and decode its intended channels without specific knowledge of scheduling assignments for other UEs or network deployments. Furthermore, UEs are not aware of the geographical location or TP from which each signal is transmitted or of the location of the RP(s). In the following, TP will sometimes be used to refer to a TP or a RP or a combined TP/RP.

In order to allow transparency of the TPs to the UEs, UE specific Demodulation Reference Signals (DMRS) are employed to assist transmission of DL channels, including data channels called Physical Downlink Shared Channels (PDSCH), and control channels called Enhanced Physical Downlink Control Channels (ePDCCH).

Antenna Ports Quasi Co-Location (QCL)

In order to allow the UEs implementation to reach a reasonable compromise between complexity and performance, a number of assumptions have been specified related to the so called antenna ports QCL. QCL assumptions are specified in LTE and in certain cases signaled or configured by the network to the UEs. Such assumptions allow the UEs to jointly estimate certain long term channel properties for selected Reference Signal (RS) antenna ports. At the same time, joint estimation of certain long term channel properties is prohibited for other RS antenna ports. Even though QCL assumptions respect the NW transparency principle described above, they implicitly enable UEs to receive signals from different TPs on different ports or resources.

An example is ePDCCH, which carries Downlink Control Information (DCI) messages that may be transmitted from different TPs. In an ePDCCH region, i.e, the region dedicated for ePDCCH transmissions, the ePDCCH resources are partitioned in Physical Resource Block (PRB) sets, where each DCI message spans resources from a single PRB set. Even though ports within a PRB set are assumed to be quasi co-located, meaning that all DCI messages received on a given ePDCCH PRB set should be transmitted from the same TP, different PRB sets may be configured with different QCL assumptions, meaning that DCI messages received on different PRB sets may be transmitted from different TPs respectively.

Improved support for heterogeneous network operations is part of the ongoing specification of 3GPP LTE Release-12, and further improvements are discussed in the context of new features. In heterogeneous networks, a mixture of cells of differently sized coverage areas and with differently overlapping coverage areas is deployed. One example of such a deployment is the one where pico cells are deployed within the coverage area of a macro cell. In general, a macro node managing a macro cell is characterized by a larger transmission power and DL coverage as compared to a pico node managing a pico cell.

Control Signaling in LTE

Messages transmitted over a radio link to UEs can be broadly classified as control messages or data messages. Control messages are used to facilitate the proper operation of the system as well as proper operation of each UE within the system. Control messages could include commands to control functions such as the transmitted power from a UE, assignments of DL and UL resources and parameters for data communication, referred to as DL grants and UL grants, information regarding the quality of the radio links or other propagation parameters, higher layer signaling, and so on.

Examples of channels carrying DL control messages are the Physical Downlink Control Channels (PDCCH) in LTE and ePDCCH in LTE Advanced which for example carry scheduling information and power control messages, the Physical Hybrid automatic repeat request Indicator Channel (PHICH) which carries Acknowledgement (ACK) and Non-acknowledgement (NACK) in response to a previous UL transmission and the Physical Broadcast Channel (PBCH) which carries system information. Also the Primary and Secondary Synchronization Signals (PSS/SSS) can be seen as control signals. They have fixed locations, periodicity in time, and frequency so that UEs that initially access the network can find them and synchronize.

In the UL, control signaling comprises e.g. ACK/NACK sent in response to previous DL transmissions, feedback regarding the channel quality and recommended transport formats, scheduling requests, and buffer status reports. UL control channels are carried by Physical Uplink Control Channel (PUCCH) and are occasionally multiplexed on Physical Uplink Shared Channel (PUSCH).

In addition, Sounding Reference Signals (SRS) are transmitted in the UL in order to assist link adaptation. In case of Type 1 SRS, the SRS transmission is triggered by certain grants for data scheduling.

Starting from LTE Rel-11, a number of parameters affecting UL transmissions can be configured in a UE specific fashion. This includes, e.g., resources for PUCCH, base (scrambling) sequences for RS associated to PUSCH and PUCCH, and other parameters associated to UL RS generation, such as cyclic shift hopping initialization, and sequence group hopping enabling.

UL Power Control in LTE

UL power control in LTE is based on a hybrid algorithm including a closed loop part and an open loop part. The closed loop part includes incremental cumulative power adjustments commanded by the NW. The closed loop component may also be configured so that the command specify an absolute adjustment value to a higher-layer configured power level. The open loop part provides autonomous power adjustment at the UE based on partial compensation of the path loss estimated based on a given DL RS. The RS used for the serving cell path loss estimation is the Cell Specific RS (CRS). The UL Power Control (PC) process governs PUCCH, PUSCH and SRS, with configurable power offsets between such channels or signals.

During the latest concept developments, a number of improvements have been done in order to better utilize the channel and propagation properties of an LTE heterogeneous network deployment, sometimes also called Hetnet. These improvements enable better channel usage and can be an important component in enabling a deployment where the UL and DL originate from different locations. One example of such an improvement is the ePDCCH control channel, which is already standardized. The current standard works reasonably well with an ideal backhaul between TPs or nodes, i.e. a fast backhaul having a delay close to zero and a close to infinite bandwidth or bit-rate capacity. Information received by one RP can then without further delay be forwarded via the backhaul to the other RP. With a non-ideal backhaul such as a slow backhaul with a delay, the situation is not as good though, as control data forwarded to another RP will be received with a delay.

Another improvement that has been done is the decoupling of UL/DL. Conventionally, UL and DL transmissions are coupled, meaning that if a DL transmission is received from a certain TP, a corresponding UL transmission would be directed to the same TP. The decoupled UL/DL provides a part of the spectral efficiency, for example in a Hetnet deployment where the UL transmission may be directed to a close by low power Pico node and the DL reception may come from a high power multiple antenna Macro node. However, the spectral efficiency gain of the decoupled UL/DL cannot be fully realized in the current LTE standard, as e.g. the power control is designed with a coupled UL/DL in mind. The output power differences between Pico and Macro nodes can cause serious problems for code or spatially multiplexed channels. The channels can be heavily interfered due to the current design of power control were a coupled UL/DL is assumed. These kinds of problems may be present in any Hetnet deployment.

SUMMARY

It is therefore an object to address some of the problems outlined above, and to provide a solution allowing performance gains of decoupled UL/DL even if the backhaul is non-ideal. This object and others are achieved by embodiments of the method and the wireless device described hereinafter.

In accordance with a first aspect, a method for selecting a set of uplink transmission parameters is provided. The method is performed in a wireless device of a radio communications system. The method comprises obtaining information mapping resources of a physical downlink control channel region to at least two sets of uplink transmission parameters. The method also comprises receiving a downlink control message on a resource of the physical downlink control channel region, and selecting a set among the at least two sets of uplink transmission parameters. The selection of set is based on the resource of the physical downlink control channel region on which the downlink control message is received, and on the obtained information mapping resources of the physical downlink control channel region to the at least two sets of uplink transmission parameters.

In accordance with a second aspect, a method for controlling a selection of a set of uplink transmission parameters by a wireless device is provided. The method is performed in a radio network node of a radio communications system. The method comprises obtaining information mapping resources of a physical downlink control channel region to at least two sets of uplink transmission parameters. The information is also available to the wireless device. The method also comprises obtaining a set among the at least two sets of uplink transmission parameters to be used by the wireless device, and determining a resource of the physical downlink control channel region which maps to the obtained set of uplink transmission parameters, based on the obtained information. The method further comprises transmitting a downlink control message to the wireless device on the determined resource, to control the selection of the set of uplink transmission parameters by the wireless device.

In accordance with a third aspect, a wireless device configured to select a set of uplink transmission parameters is provided. The wireless device is configured to be used in a radio communications system. The wireless device comprises a processing circuit, and a receiver. The processing circuit is configured to obtain information mapping resources of a physical downlink control channel region to at least two sets of uplink transmission parameters. The receiver is configured to receive a downlink control message on a resource of the physical downlink control channel region. The processing circuit is further configured to select a set among the at least two sets of uplink transmission parameters based on the resource of the physical downlink control channel region on which the downlink control message is received, and on the obtained information mapping resources of the physical downlink control channel region to the at least two sets of uplink transmission parameters.

In accordance with a fourth aspect, a radio network node of a radio communications system, configured to control a selection of a set of uplink transmission parameters by a wireless device is provided. The radio network node comprises a processing circuit configured to obtain information mapping resources of a physical downlink control channel region to at least two sets of uplink transmission parameters. The information is also available to the wireless device. The processing circuit is also configured to obtain a set among the at least two sets of uplink transmission parameters to be used by the wireless device, and to determine a resource of the physical downlink control channel region which maps to the obtained set of uplink transmission parameters, based on the obtained information. The radio network node further comprises a transmitter configured to transmit a downlink control message to the wireless device on the determined resource, to control the selection of the set of uplink transmission parameters by the wireless device.

An advantage of embodiments is that UL/DL decoupling in a system with multiple TP reception and transmission can be used with good performance even if the backhaul between TPs is slow.

Another advantage of embodiments is that UL/DL decoupling may provide even further performance gains even if the backhaul is fast or ideal, as it is possible to direct control data and user data to the best suited TP, avoiding transmitting all data to all involved TPs.

Still another advantage of embodiments is that the power control problem that occurs in all radio systems with dual connectivity (i.e. with transmission to and reception from two TPs) as described in the background section is solved. Furthermore, it is possible to signal power control settings using e.g. ePDCCH PRB sets, and hence without any additional overhead in the signaling associating power control settings to two TPs. Power control is one important parameter for good performance in radio systems with frequency reuse.

Other objects, advantages and features of embodiments will be explained in the following detailed description when considered in conjunction with the accompanying drawings and claims.

DETAILED DESCRIPTION

Figure 1:
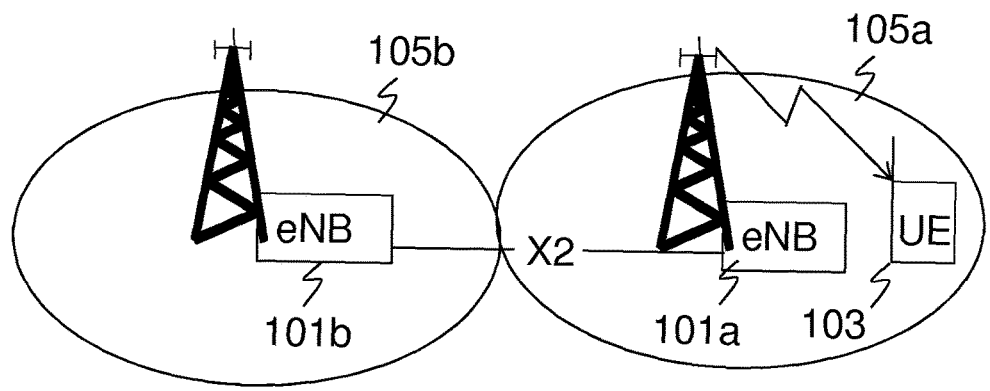
FIG. 1 is a schematic illustration of an LTE or LTE Advanced network.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of methods, a wireless device, and a node, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an example scenario in an LTE Advanced network with ePDCCH. Furthermore, the wireless device is exemplified by a User Equipment (UE) and the radio network node by an eNodeB. However, it should be noted that the embodiments may be applied to other radio access network technologies with physical downlink control channel mechanisms similar to those in LTE Advanced, such as the PDCCH in LTE, and to other types of wireless devices and radio network nodes.

In this disclosure a method for selection of UL transmission parameter sets performed by a UE is proposed. The UE is performing the method in a radio communications system where the UE support multiple instances of UL channels, as in a dual connectivity or CoMP network. The proposed scheme uses associations or mappings between two or more UL transmission parameter sets and resources such as ePDCCH PRB sets in one ePDCCH region. A detected ePDCCH on a particular ePDCCH PRB set of the ePDCCH region determines which UL transmission parameter set that is selected for the UL transmission in response to e.g. a DL or UL grant carried by the ePDCCH.

However, the resources of a physical DL control channel region mapped to UL transmission parameter sets may in another embodiment correspond to partitions of the PDCCH or ePDCCH search space mapped to PUCCH/PUSCH transmission parameter sets. A search space is the different Control Channel Element (CCE) positions and eCCEs positions where the PDCCH and ePDCCH respectively may be situated. The UE should blindly decode the search space in order to find (e)PDCCH grants or assignments to the UE. If the search space contains a grant to another UE the cyclic redundancy check will fail for the decoding UE and it will not "listen" to the grant. The network is thus free to pick one or more specific CCEs in the search space when transmitting control messages. These specific CCEs may thus also be mapped to UL transmission parameter sets. This means, for example, that two UEs scheduled in the same ePDCCH PRB set but in different eCCEs, could use different UL transmission parameter sets.

An UL transmission parameter set may comprise one or more UL transmission parameters. Two UL transmission parameter sets may comprise different types of parameters respectively, and they may additionally or alternatively comprise different values of a same type of parameter respectively.

According to embodiments, the method in the UE comprises the following:

1) Obtaining a mapping from the resources of the control channel region to specific UL transmission parameters sets. The resources of the control channel region may be the ePDCCH PRB sets or evolved Resource Element Groups (eREGs) of the ePDCCH region, PDCCH Resource Element Groups (REGs) of the PDCCH region, or ePDCCH/PDCCH search spaces over which DL control messages such as DCI messages are transmitted. The UL transmission parameter sets may e.g. comprise PUSCH/PUCCH/SRS transmission parameters. In such an UL transmission parameter set, some transmission parameters may be common for PUSCH and PUCCH, while other parameters may be specific for PUSCH, PUCCH or SRS only. Therefore only a subset of the UL transmission parameter set relating to PUCCH may be used when doing a PUSCH transmission. The parameters in the UL transmission parameter sets determine physical layer characteristics for the transmission of an UL message, and/or a content of the UL message when the parameters are applied.

2) Receiving a DL control message on one or more resources of the control channel region, e.g. on an ePDCCH PRB set.

3) Selecting an UL transmission parameter set based on the resource(s), e.g. the ePDCCH PRB set, used by the received DL control message, and based on the mapping obtained in step 1) above.

4) Applying the selected UL transmission parameters set for the transmission of an UL control message or an UL data message sent in response to the received DL control message. In embodiments, the content and/or the physical layer characteristics of the UL control or data messages are derived or determined using the specific UL transmission parameter set selected for the UL message resource. For example, for periodic Channel State Information (CSI) transmitted in the UL, the selected UL transmission parameter set will contain a PUCCH Format 2 resource index, a PUCCH configuration, a specification about which reference symbols the CSI should be measured on, and PUCCH power control parameters comprising e.g. a power control adjustment state. This means that the periodic CSI will be specific to a specific channel state measurement and that it will be sent by the UE according to the UL transmission parameter set, e.g., on a specific PUCCH resource, and with a specific power which are physical layer characteristics. Furthermore, the specification about which reference symbols the CSI should be measured on is an example of a parameter that determines content of the CSI transmitted in the UL.

The above described method in the UE makes it possible for a radio network node such as an eNodeB to control the UEs selection of a set of UL transmission parameters. According to embodiments, the corresponding method in the eNodeB comprises the following:

i) Obtaining information mapping resources of a physical downlink control channel region to at least two sets of UL transmission parameters. As we have described above under 1), the information is also available to the UE.

ii) Obtaining a set among the at least two sets of UL transmission parameters to be used by the UE. This is the set that the eNodeB wants the UE to use when transmitting in the UL in response to a DL control message from the eNodeB. The set may e.g. be determined by the eNodeB based on information related to which one of the RPs that should be the receiving RP. This affects e.g. what transmission power that should be used by the UE when sending in the UL, so the UL transmission parameter set may be determined to contain different settings of a power control parameter. The set may alternatively be received from another network node.

iii) Determining a resource of the physical downlink control channel region which maps to the obtained set of UL transmission parameters. This is done based on the information obtained under i) above.

iv) Transmitting a downlink control message to the UE on the determined resource. In this way the eNodeB may control the UEs selection of the set of UL transmission parameters.

The UL transmission parameter sets may be configured by the network for each UE in a semi-static fashion, e.g., by RRC configuration. Some UL transmission parameters sets may be default sets. The configuration of the different UL transmission parameter sets and the configuration of what parameters a specific UL transmission parameter set comprises may be provided in a same or in different configuration messages. The configurations may also be pre-configured in the UE and in radio network nodes. Alternatively, the configuration of the UL transmission parameter sets may be determined based on a pre-configured procedure for how to calculate or determine the UL transmission parameter sets.

Obtaining the information mapping physical DL control channel resources to UL transmission parameters sets may comprise receiving the mapping information from the network. Alternatively the mapping information may be pre-configured in the UE and in radio network nodes.

In one embodiment, the UE may be configured for dual-connectivity using two UL transmission parameter sets. The associated values of the parameters in the two UL transmission parameter sets are derived from the control and broadcast information received from the network nodes or the TPs that the UE is connected to. The ePDCCH PRB sets corresponding to the two UL transmission parameter sets are further the sets configured by the two network nodes or TPs for the UE. The network is in this embodiment statically, semi-statically or dynamically configured to signal non-conflicting ePDCCH PRB sets associated to the two network nodes or TPs the UE is connected to.

An UL transmission parameter set may comprise one or more of the following parameters determining physical layer characteristics of the UL transmission:

Parameters associated to UL RS generation, such as virtual cell ID, base sequences generation parameters, cyclic shift hopping initialization, sequence group hopping enabling, and power control settings;

Power control parameters, such as RS for path loss estimation for open loop power control, power offset parameters, selection of one of multiple closed loop power control processes;

PUCCH configuration parameters, such as resource offset, PUCCH RS parameters, power offset, mapping parameters;

UL Control Information (UCI) encoding parameters, such as coding gain, spectral efficiency offset (parameter "beta" in the standard specifications), selected modulation/coding scheme.

Also other UL transmission parameters for PUCCH, PUSCH and/or SRS are possible. UL transmission parameters of the sets may be dynamically set variables as well as persistent or semi-persistent parameters. One example of dynamically set variables is the power control adjustment state f(i), where the UE shall hold one variable per UL transmission parameter set. When a UE-specific correction value is decoded on an ePDCCH PRB set, the value in the associated UL transmission parameter set is updated.

Some examples of associations or mappings from physical DL control channel resources such as ePDCCH PRB sets and PDCCH REGs to specific PUSCH/PUCCH/SRS transmission parameter sets are listed in the following:

a. UCI related to a particular DL grant, i.e. DL ACK/NACK, will be carried by the PUSCH/PUCCH according to an UL transmission parameter set associated with the ePDCCH PRB set on which the ePDCCH that carried the DL grant was detected.

b. UCI, e.g., a-periodic CSI triggered by a particular UL grant, will be carried by the PUSCH/PUCCH according to an UL transmission parameter set associated with the ePDCCH PRB set on which the ePDCCH that carried the UL grant was detected.

c. UL data scheduled by a particular UL grant received on the DL will be carried by the PUSCH/PUCCH according to an UL transmission parameter set associated with the ePDCCH PRB set on which the ePDCCH that carried the UL grant was detected.

d. SRS triggered by a particular grant will be transmitted according to the SRS transmission parameters of the UL transmission parameter set associated with the ePDCCH PRB set on which the ePDCCH that carried the grant was detected.

In some embodiments of the invention, the UE is preconfigured with a multitude of ePDCCH PRB sets and a multitude of UL transmission parameters sets. Each UL transmission parameter set may be given identical or different configurations such as power control parameters and/or UCI coding and/or RS parameters. The UE is then configured with associations or mappings between the ePDCCH PRB sets and the UL transmission parameters sets.

In some embodiments each UL transmission parameters set includes a configuration of periodic CSI including resource allocation on PUCCH and association to PUCCH power control process.

In other embodiments the UE receives an ePDCCH PRB set configuration including an association or mapping to an already configured UL transmission parameters set.

In further other embodiments the UE receives configurations of ePDCCH PRB sets, UL transmission parameters sets, and the associations between them from the network.

Dual Connectivity Mode

One exemplifying embodiment relates to a heterogeneous network consisting of a high-power TP and a low-power TP interconnected via a backhaul that is non-ideal. The TPs may form individual cells or may be part of the same cell. Since the backhaul is non-ideal, no fast coordination between the TPs is possible. Due to the power difference between the TPs, a UE may be in a transition zone where it is preferred that the UE is connected to one of the TPs in DL while being connected to another RP in UL.

In the considered scenario, UCI information such as DL ACK/NACK and CSI is preferably directed to the TP, referred to as TP#1, handling the DL traffic, while UL data is preferably directed to the TP, referred to as TP#2, handling the UL traffic. It may also be preferable that some DL traffic such as Radio Link Control (RLC) feedbacks related to UL data is sent from TP#2. Hence, the UE shall be prepared to direct DL ACK/NACK towards both TPs in a proper way.

Figure 2:
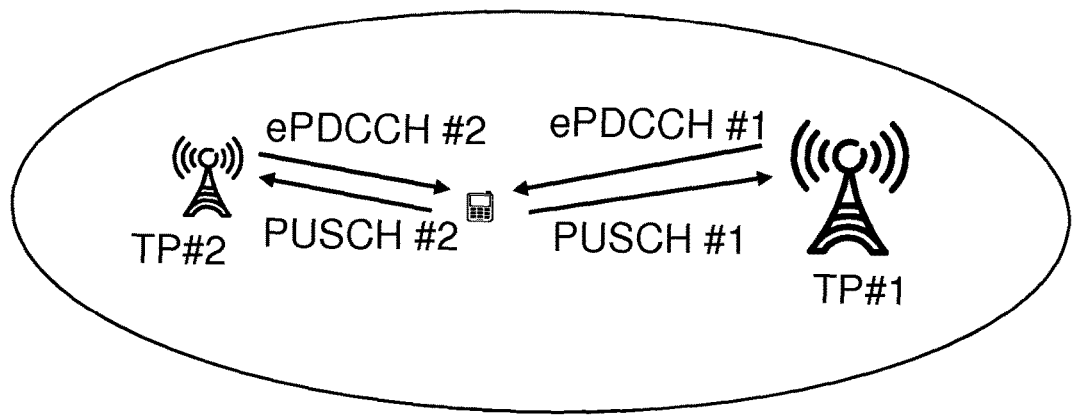
FIG. 2 is a schematic illustration of a scenario according to one embodiment.

In one embodiment of the invention, schematically illustrated in FIG. 2, the UE is configured with two ePDCCH PRB sets (ePDCCH #1 and ePDCCH #2), two PUSCH/PUCCH transmission parameters sets (PUSCH #1 and PUSCH #2), and a mapping between the two ePDCCH PRB sets and the two PUSCH/PUCCH transmission parameters sets, such that:

ePDCCH #1 is associated with PUSCH #1
ePDCCH #2 is associated with PUSCH #2.

The mapping enforce the UE to act in the following way upon receiving grant(s) carried on an ePDCCH on a resource, i.e., an ePDCCH PRB set, of the ePDCCH region. The resource is denoted ePDCCH #i, where i in this example may be equal to 1 or 2 (i=1 or 2):

When a DL grant is received on resource ePDCCH #i without an UL grant, the UE shall direct DL ACK/NACK to PUCCH applying transmission parameters set #i, assuming that such an UL resource is allocated to the UE.

When DL and UL grant is received on resource ePDCCH #i, the UE shall direct DL ACK/NACK to PUSCH applying transmission parameters set #i, assuming that such an UL resource is allocated to the UE.

When UL grant without a-periodic CSI request is received on resource ePDCCH #i, the UE shall direct UL data to PUSCH applying transmission parameters set #i.

When UL grant with a-periodic CSI request is received on resource ePDCCH #i, the UE shall direct UL data and UCI to PUSCH applying transmission parameters set #i.

Power control may be included in the UL transmission parameter set, to properly adjust the power of UL channels to reach desired TP. Note also that i may be larger than 2, if there are more than two configured resources of the ePDCCH region mapped to UL transmission parameter sets.

The term "CSI process" is a terminology in 3GPP that is used to describe multiple channel state reporting. A CSI process defines how and where the UE shall estimate the channel and the interference. The reporting method for a CSI process can be periodic, typically reported on PUCCH, or a-periodic, alternatively granted, where the eNodeB sends a PUSCH grant on which the CSI shall be sent. As 3GPP R-11 with Transmission mode 10 UEs supports setting up multiple CSI processes, there may be multiple ways for which the UE shall estimate channel and interference. The CSI is formatted and included in an UL control message. If reporting CSI for multiple CSI processes the CSI for the CSI processes are multiplexed in a specified way in the UL control message.

In some embodiments of the invention and considering the scenario illustrated in FIG. 2, it may be desired to direct CSI towards TP#2 in order for TP#2 to make proper link adaptation for e.g. RLC feedbacks related to the UL traffic. In such embodiments it may be desirable to associate CSI processes with ePDCCH PRB sets. In an alternative embodiment, the CSI processes are associated with PUSCH/PUCCH transmission parameters sets.

The UE may be configured with two CSI processes where CSI process #1 and CSI process #2 are associated with ePDCCH PRB set #1 and ePDCCH PRB set #2 respectively. When e.g. UCI for CSI process #1 is to be reported, triggered by an a-periodic CSI request or a periodic "request", then the UCI is directed to the PUSCH/PUCCH using the transmission parameters set PUSCH#1 associated with ePDCCH PRB set ePDCCH#1. The transmission parameter set thus comprises parameters specifying the UCI that shall carry the CSI reporting information. These parameters may be for periodic CSI reporting which is semi-statically configured by higher layer, for a-periodic CSI reporting dynamically determined based on which physical downlink control channel resource that carried the CSI request, or for a-periodic CSI reporting with a combination of higher-layer configured and dynamically determined, where for example the higher-layer configuration determine how to map to UCI based on the which physical downlink control channel resource that carried the CSI request.

In embodiments, the UL transmission parameter sets may comprise parameters specifying content of the UCI and physical layer characteristics for the UCI transmission that shall carry a HARQ feedback, i.e., DL ACK/NACK sent in response to a DL transmission granted on a resource of a physical downlink control channel region.

Fast UL Power Control for Ideal Backhaul

Geometry of the UE is a measure of interference. In a scenario with two TPs called TP1 and TP2, the geometry for a UE assuming that TP1 is the receiving TP, is calculated as the path gain between TP1 and the UE divided by the path gain between TP2 and the UE. Thus, if the geometry is large, the received power at TP2 from the UE is small, i.e., a transmission by the UE induces little interference at TP2 and the UE may transmit at a higher power without inducing too much interference.

In one embodiment, a first PUSCH transmission parameters set, PUSCH #1, comprises a parameter that provides a higher power than a corresponding parameter of a second PUSCH transmission parameters set, PUSCH #2. Furthermore, a first ePDCCH PRB set, ePDCCH #1, is mapped to PUSCH #1, and a second ePDCCH PRB set, ePDCCH #2, is mapped to PUSCH #2. When the UE has high geometry to its serving cell, the UE may be scheduled and receive a grant on resource ePDCCH #1, while when it has low geometry the UE may be scheduled and receive a grant on resource ePDCCH #2. In this way the transmission power of the UE may be controlled in a signaling efficient way.

The PUSCH transmission parameter sets mapped to different resources of the ePDCCH region also allow a fast adjustment of the power. If for example, there are two TPs such as two eNodeBs, each of the TPs serving one UE, a typical UE power control method is to aim for a specific received power at the serving RP to avoid causing interference at the other RP. This is a good strategy if both UEs are served. However, if only one of the UEs is served in a particular TTI, then that UE could use full power in the TTI as there is no UE that suffers from the interference. The 3GPP standard supports adjusting the power, but only smaller adjustments are possible on a TTI basis. It thus takes several TTIs to make adjustments that are larger than a couple of dB. According to embodiments of the current invention, a very fast adjustment of the power is enabled.

Fast Backhaul CoMP Operating Mode

Figure 3:
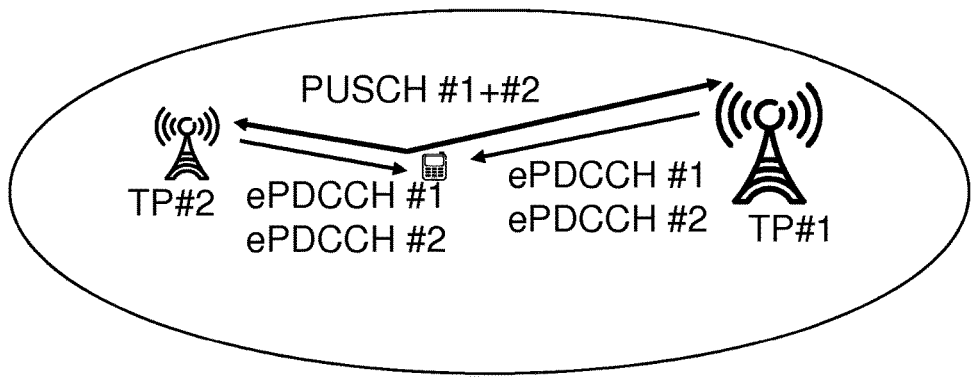
FIG. 3 is a schematic illustration of a scenario according to one embodiment.

Another exemplifying embodiment relates to a scenario with a CoMP heterogeneous network, illustrated in FIG. 3. Also here, ePDCCH PRB sets, ePDCCH #1 and ePDCCH #2, are associated with or mapped to different PUSCH/PUCCH transmission parameter sets, PUSCH #1 and PUSCH #2. However, contrary to the scenario illustrated in FIG. 2, the UL is jointly received at the two TPs, TP#1 and TP#2.

In this embodiment the heterogeneous network consisting of a high-power TP, TP#1, and a low-power TP, TP#2, is interconnected via a backhaul that is fast, which is a prerequisite for using UL or DL CoMP between the TPs. The TPs may either form individual cells or may be part of the same cell.

For UL-CoMP the UL reception is possible in both TP#1 and TP#2. In one example, the signal in the TP with the best reception is used, and in another example the signals received from both TP#1 and TP#2 are combined. For the UL transmission power control, the UE hence ideally should use different power control processes depending on if the signals are combined or not. The power control setting used may for example be based upon the TP with the lowest power setting, $P_{CoMP}=\min(P_{TP\#1}, P_{TP\#2})$. This may be achieved by defining this behavior in the UE, or by dynamically signaling using the ePDCCH PRB sets mapped to UL transmission parameter sets as in embodiments of the invention. The eNodeB may thus control the power settings by:

Using a first ePDCCH PRB set, ePDCCH #1, when sending a grant if $P_{TP\#2}>P_{TP\#1}$. The ePDCCH #1 is mapped to an UL transmission parameter set comprising a transmission power parameter that indicates to adjust the power to $P_{TP\#1}$ when transmitting in the UL. In this way the eNodeB signals to the UE to use $P_{TP\#1}$ as $P_{CoMP}$.

Using a second ePDCCH PRB set, ePDCCH #2, if $P_{TP\#1}>P_{TP\#2}$. The ePDCCH #2 is mapped to an UL transmission parameter set comprising a transmission power parameter that indicates to adjust the power to $P_{TP\#2}$ when transmitting in the UL. In this way the eNodeB signals to the UE to use $P_{TP\#2}$ as $P_{CoMP}$.

The power control setting used may alternatively be based upon some combination, i.e. that a total received power to TP#1 and TP#2 fulfill a received power target.

A further possibility, if the power control is autonomously handled by the UE, is to use ePDCCH #1 and ePDCCH #2 instead to signal the UL-DMRS settings and/or PUCCH settings to use. For example, when it is possible to schedule multiple UEs in an area, different PUCCH resources may be indicated by parameters of the two transmission parameter sets which are mapped to ePDCCH#1 and ePDCCH#2. In this way collisions on PUCCH may be avoided. In addition or alternatively, different DMRS base sequences may be associated to ePDCCH#1 and ePDCCH#2 to be able to maintain pseudo orthogonally between UEs that cannot be given orthogonal UL-DMRS settings.

Methods and Apparatus

Figure 4A:
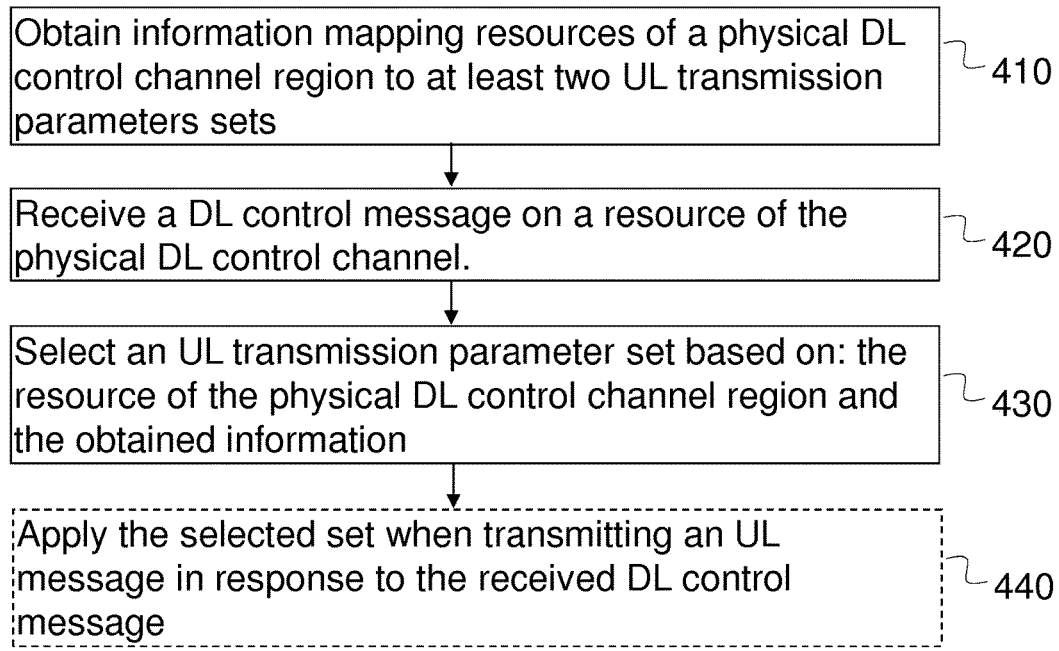
FIG. 4a is a flowchart illustrating a method in a wireless device according to embodiments.

FIG. 4a is a flowchart illustrating one embodiment of a method for selecting a set of UL transmission parameters. The method is performed in a wireless device of a radio communications system. The wireless may e.g. be a UE in a E-UTRAN. The method comprises:

410: Obtaining information mapping resources of a physical DL control channel region to two or more sets of UL transmission parameters.

420: Receiving a DL control message on a resource of the physical DL control channel region. The DL control message is received from a radio network node. The radio network node may control the selection in next step 430 by the wireless device, by using the appropriate resource of the physical DL control channel region for the transmission to the wireless device.

430: Selecting a set among the two or more sets of UL transmission parameters. The selection is based on the resource of the physical DL control channel region on which the DL control message is received, and on the obtained information mapping resources of the physical DL control channel region to the two or more sets of UL transmission parameters.

440: The optional step of applying the selected set of UL transmission parameters when transmitting an UL message in response to the received DL control message.

Applying, 440, the selected set may comprise at least one of the following:

Determining a physical layer characteristic of the transmission of the UL message based on at least one parameter in the selected set. Examples of parameters used for determining physical layer characteristics of the transmission are: parameters associated to UL RS; power control parameters; PUCCH configuration parameters; and UL control information encoding parameters.

Determining a content of the UL message based on at least one parameter in the selected set. Examples of parameters used for determining a content of the UL message are CSI process parameters for specifying UCI content, and HARQ parameters mapping DL HARQ feedback to UCI parameters. CSI process parameters may be defined as new parameters in 3GPP specifications to control how CSI related to a CSI process is reported on PUCCH/PUSCH. For example, a CSI process may have a parameter called "UL transmission parameter set indicator" that indicates which UL transmission parameter set should be used to carry the CSI of the CSI process.

A value of a parameter in the selected set of UL transmission parameters may be set based on a content of the received DL control message. One example of dynamically set variables is the power control adjustment state f(i), as described above.

In one exemplary embodiment, the obtained information, in 410, maps a first resource of the physical DL control channel region to a first set of UL transmission parameters, and a second resource of the physical DL control channel region to a second set of UL transmission parameters. The selecting may comprise:

Selecting the first set of transmission parameters when the DL control message is received on the first resource of the physical DL control channel region; and Selecting the second set of transmission parameters when the DL control message is received on the second resource of the physical DL control channel region.

The resources of the physical DL control channel region may be ePDCCH PRB sets of an ePDCCH in an E-UTRAN, and the two or more sets of UL transmission parameters may be sets of transmission parameters for at least one of PUCCH transmissions, PUSCH transmissions, and SRS transmissions.

In one embodiment, obtaining 410 the information mapping resources of a physical DL control channel region to the two or more sets of UL transmission parameters comprises receiving the information from a radio network node in a configuration message, or retrieving the information pre-configured in the wireless device.

A configuration of the two or more sets of UL transmission parameters may be received from a radio network node in at least one configuration message, or may be pre-configured in the wireless device.

The two or more sets of UL transmission parameters may respectively comprise at least one of different types of parameters, and different values of a same type of parameter. When two sets of UL transmission parameters comprise a same type of parameter, the values of the parameter may differ.

Figure 4B:
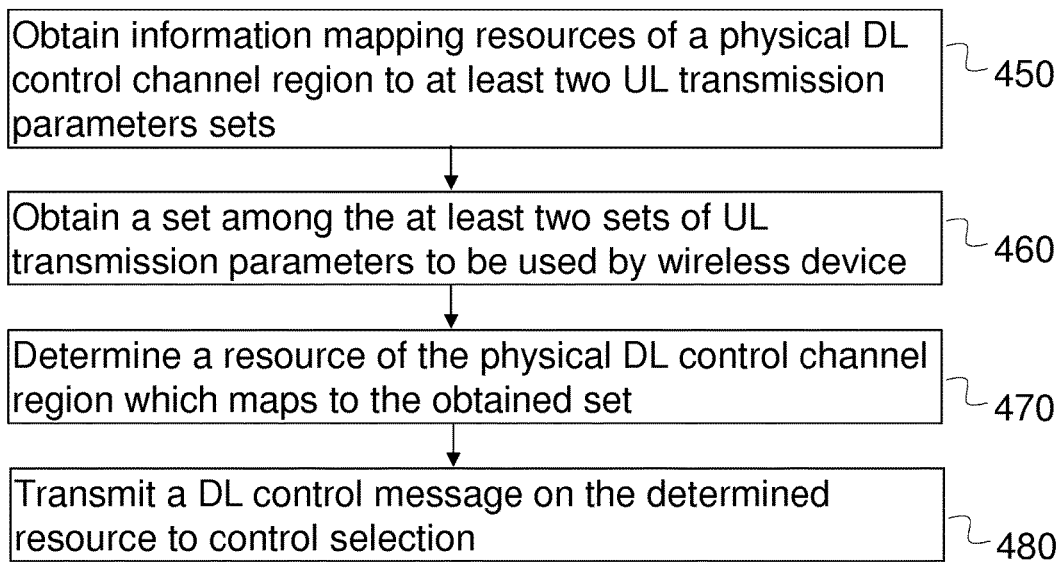
FIG. 4b is a flowchart illustrating a method in a radio network node according to embodiments.

FIG. 4b is a flowchart illustrating one embodiment of a method for controlling a selection of a set of UL transmission parameters by a wireless device. The method is performed in a radio network node of a radio communications system. The method comprises:

450: Obtaining information mapping resources of a physical DL control channel region to two or more sets of UL transmission parameters. The information is also available to the wireless device

460: Obtaining a set among the two or more sets of UL transmission parameters to be used by the wireless device

470: Determining a resource of the physical DL control channel region which maps to the obtained set of UL transmission parameters, based on the obtained information.

480: Transmitting a DL control message to the wireless device on the determined resource, to control the selection of the set of UL transmission parameters by the wireless device.

Obtaining, 460, the set of UL transmission parameters may comprise receiving the set from another network node.

Alternatively, obtaining the set of UL transmission parameters may comprise determining the set. The set may e.g. be determined based on what RP that should be receiving the UL message from the UE. The obtained set of UL transmission parameters may comprises parameters used by the wireless device to determine at least one of the following: a physical layer characteristic of the transmission of an UL message; and a content of the UL message.

The resources of the physical DL control channel region may be PRB sets of an ePDCCH in an E-UTRAN, and the two or more sets of UL transmission parameters may be sets of transmission parameters for at least one of PUCCH transmissions, PUSCH transmissions, and SRS transmissions.

The method in the radio network node may further comprise transmitting the information mapping the resources of the physical DL control channel region to the two or more sets of UL transmission parameters to the wireless device in a configuration message. The two or more sets of UL transmission parameters may respectively comprise at least one of: different types of transmission parameters; and different values of a same type of transmission parameters.

Obtaining, in 450, the information mapping resources of the physical DL control channel region to the two or more sets of UL transmission parameters may comprise receiving the information from another network node in a configuration message, or retrieving the information pre-configured in the radio network node.

Figure 5:
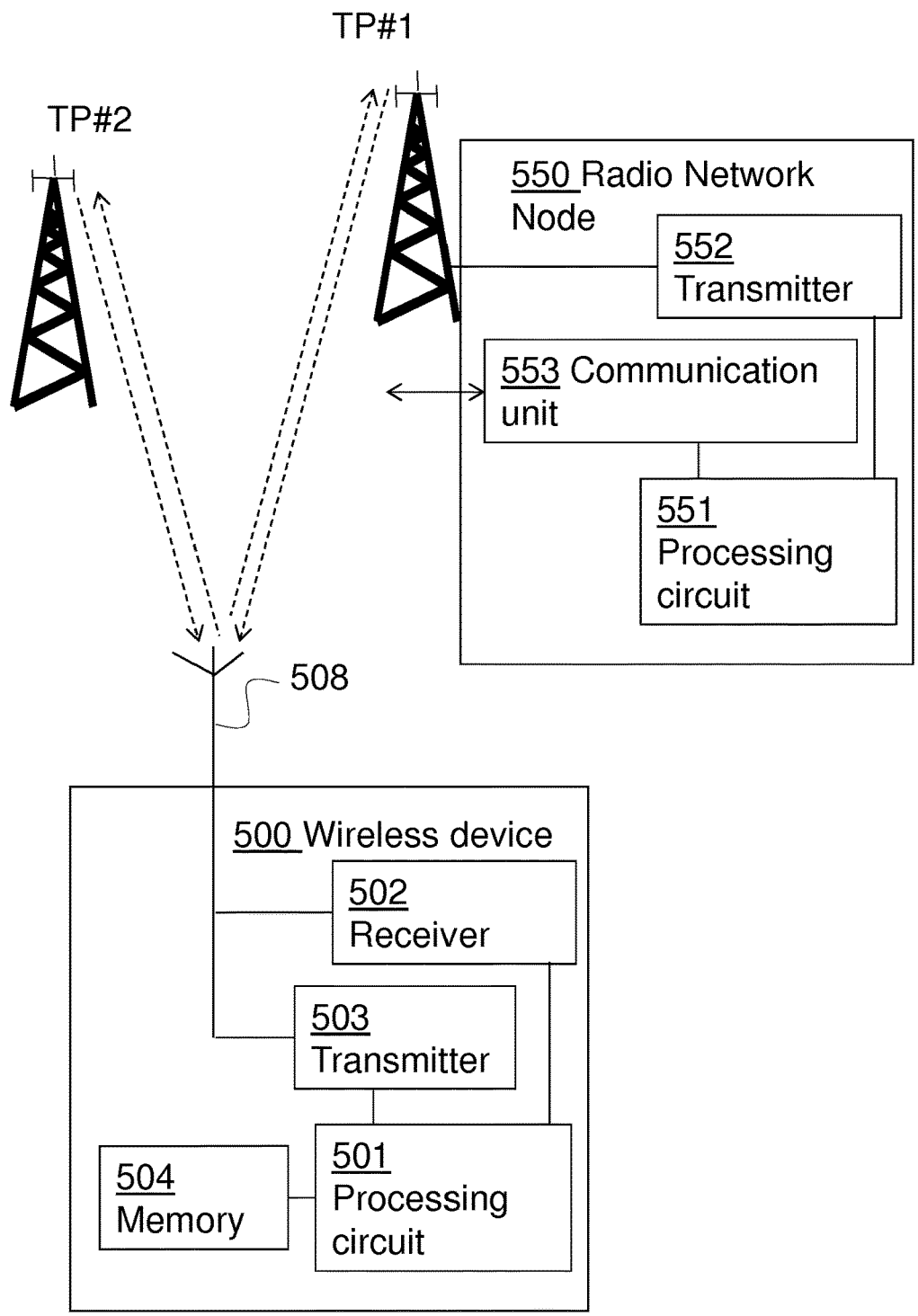
FIG. 5 is a block diagram schematically illustrating a wireless device and a radio network node according to embodiments.

An embodiment of a wireless device 500 and of a radio network node 550 of a radio communications system, are schematically illustrated in the block diagram in FIG. 5.

The wireless device 500 is configured to select a set of UL transmission parameters. The wireless device 500 comprises a processing circuit 501, a receiver 502, a transmitter 503, and a memory 504. The receiver 502 and the transmitter 503 may be connected via antenna ports to a same or to different antennas 508. The processing circuit 501 is configured to obtain information mapping resources of a physical DL control channel region to at least two sets of UL transmission parameters. The receiver 502 is configured to receive a DL control message on a resource of the physical DL control channel region. The processing circuit 501 is further configured to select a set among the at least two sets of UL transmission parameters based on:

The resource of the physical DL control channel region on which the DL control message is received; and The obtained information mapping resources of the physical DL control channel region to the at least two sets of UL transmission parameters.

The processing circuit 501, the receiver 502, the transmitter 503, and the memory 504 may be logical units, separate physical units or a combination of both logical and physical units.

The processing circuit 501 may be further configured to apply the selected set of UL transmission parameters when transmitting an UL message via the transmitter in response to the received DL control message. In one embodiment, the processing circuit may be configured to apply the selected set by at least one of the following: determining a physical layer characteristic of the transmission of the UL message based on at least one parameter in the selected set; and determining a content of the UL message based on at least one parameter in the selected set.

The processing circuit may be configured to set a value of a parameter in the selected set of UL transmission parameters based on a content of the received DL control message.

In one embodiment, the obtained information maps a first resource of the physical DL control channel region to a first set of UL transmission parameters, and a second resource of the physical DL control channel region to a second set of UL transmission parameters. The processing circuit 501 may be configured to select the set by selecting the first set of transmission parameters when the DL control message is received on the first resource of the physical DL control channel region, and selecting the second set of transmission parameters when the DL control message is received on the second resource of the physical DL control channel region.

The processing circuit 501 may be configured to obtain the information mapping resources of a physical DL control channel region to at least two sets of UL transmission parameters by receiving the information via the receiver 502 from a radio network node 550 in a configuration message. Alternatively, the pre-configured information may be retrieved from the memory 504 of the wireless device.

In one embodiment, a configuration of the at least two sets of UL transmission parameters may be received via the receiver 502 from a radio network node 550 in at least one configuration message, or may be pre-configured in the memory 504 of the wireless device.

The resources of the physical DL control channel region may be PRB sets of an ePDCCH in an E-UTRAN, and the at least two sets of UL transmission parameters may be sets of transmission parameters for at least one of PUCCH transmissions, PUSCH transmissions, and SRS transmissions.

The at least two sets of UL transmission parameters may respectively comprise at least one of different types of parameters, and different values of a same type of parameter. When two sets of UL transmission parameters comprise a same type of parameter, the values of the parameter may differ.

The radio network node 550 illustrated in FIG. 5, is configured to control a selection of a set of UL transmission parameters by the wireless device 500. The radio network node may e.g. be a TP, TP#2, in a dual connectivity embodiment with a second TP, TP#1. The radio network node 550 comprises a processing circuit 551 configured to:
Obtain information mapping resources of a physical DL control channel region to at least two sets of UL transmission parameters, wherein the information is also available to the wireless device;
Obtain a set among the at least two sets of UL transmission parameters to be used by the wireless device; and
Determine a resource of the physical DL control channel region which maps to the obtained set of UL transmission parameters, based on the obtained information.

The radio network node 550 further comprises a transmitter 552 configured to transmit a DL control message to the wireless device 500 on the determined resource. This is done to control the selection of the set of UL transmission parameters by the wireless device 500.

The radio network node may further comprise a communication unit 553. The processing circuit 551 may be configured to obtain the set of UL transmission parameters by receiving the set from another network node via the communication unit 553. Alternatively, the processing circuit 551 may be configured to obtain the set of UL transmission parameters by determining the set.

The transmitter 552 may be configured to transmit the information mapping the resources of the physical DL control channel region to the at least two sets of UL transmission parameters to the wireless device in a configuration message.

The processing circuit 551 may be configured to obtain the information mapping resources of the physical DL control channel region to the at least two sets of UL transmission parameters by receiving the information from another network node in a configuration message via a communication unit 553, or by retrieving the information pre-configured in the radio network node 550.

The resources of the physical DL control channel region may be PRB sets of an ePDCCH in an E-UTRAN, and the at least two sets of UL transmission parameters may be sets of transmission parameters for at least one of PUCCH transmissions, PUSCH transmissions, and SRS transmissions.

The at least two sets of UL transmission parameters may respectively comprise at least one of different types of parameters, and different values of a same type of parameter. When two sets of UL transmission parameters comprise a same type of parameter, the values of the parameter may differ.

In an alternative way to describe the embodiment in FIG. 5, the wireless device 500 comprises in addition to the receiver 502, the transmitter 503, and the memory 504 already described with reference to FIG. 5, a Central Processing Unit (CPU) which may be a single unit or a plurality of units. Furthermore, the wireless device 500 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the wireless device 500 causes the CPU to perform steps of the procedure described earlier in conjunction with FIG. 4*a*. In other words, when said code means are run on the CPU, they correspond to the processing circuit 501 of FIG. 5.

Similarly, the radio network node 550 in FIG. 5 may comprise in addition to the communication unit 553 and the transmitter 552 already described with reference to FIG. 5, a Central Processing Unit (CPU) which may be a single unit or a plurality of units. Furthermore, the radio network node 550 may comprise at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the radio network node 550 causes the CPU to perform steps of the procedure described earlier in conjunction with FIG. 4*b*. In other words, when said code means are run on the CPU, they correspond to the processing circuit 551 of FIG. 5.

Alternatively, the wireless device and the radio network node may comprise several functional units which may be implemented in hardware, software, firmware or any combination thereof. In one embodiment, the wireless device comprises: an obtaining unit for obtaining information mapping resources of a physical DL control channel region to two or more sets of UL transmission parameters; a receiving unit for receiving a DL control message on a resource of the physical DL control channel region; and a selecting unit for selecting a set among the two or more sets of UL transmission parameters. Furthermore, the radio network node comprises: an obtaining unit for obtaining information mapping resources of a physical DL control channel region to two or more sets of UL transmission parameters, and for obtaining a set among the two or more sets of UL transmission parameters to be used by the wireless device; a determining unit for determining a resource of the physical DL control channel region which maps to the obtained set of UL transmission parameters, based on the obtained information; and a transmitting unit for transmitting a DL control message to the wireless device on the determined resource, to control the selection of the set of UL transmission parameters by the wireless device.

The above mentioned and described embodiments are only given as examples and should not be limiting. Other solutions, uses, objectives, and functions within the scope of the accompanying patent claims may be possible.

The invention claimed is:

1. A method of uplink transmit power control performed in a wireless device of a radio communications system, the method comprising:
   maintaining mapping information that associates different settings of an uplink power control parameter with different resources of a physical downlink control channel region;
   receiving a downlink control message on a resource of the physical downlink control channel region, the downlink control message being received from a first radio network node serving the wireless device in conjunction with a second radio network node;
   using the mapping information to identify the setting of the uplink power control parameter that is associated with the resource on which the downlink control message was received; and
   transmitting an uplink message for the second radio network node, using an uplink transmission power determined in dependence on the identified setting of the uplink power control parameter.

2. The method according to claim 1, further comprising determining a content of the uplink message based on at least one further parameter that, according to the mapping information, is associated with the resource on which the downlink control message was received.

3. The method according to claim 1, wherein the mapping information maps a first resource of the physical downlink control channel region to a first set of uplink transmission parameters, and a second resource of the physical downlink control channel region to a second set of uplink transmission parameters, and wherein the method includes the wireless device
   selecting the first set of transmission parameters when the downlink control message is received on the first resource of the physical downlink control channel region, and
   selecting the second set of transmission parameters when the downlink control message is
      received on the second resource of the physical downlink control channel region, the first and second sets of transmission parameters respectively including a first setting
      and a different, second setting for the uplink power control parameter.

4. The method according to claim 1, wherein the resources of the physical downlink control channel region are physical resource block sets of an enhanced physical downlink control channel, ePDCCH, in an evolved universal terrestrial radio access network, E-UTRAN, and wherein wireless devices use the identified setting of the uplink power control parameter to control uplink transmission power for at least one of Physical Uplink Control Channel transmissions, Physical Uplink Shared Channel transmissions, and Sounding Reference Signal transmissions.

5. The method according to claim 1, further comprising receiving the mapping information from a radio network node in a configuration message.

6. The method of claim 1, wherein different Uplink Control Information (UCI) settings map to different resources of the downlink control channel region, according to the mapping information, and wherein the method includes performing a transmission of UCI, according to the UCI settings that, according to the mapping information, are associated with the resource on which the downlink control message was received.

7. A method of uplink transmit power control performed in a first radio network node of a radio communications system, the method comprising:
   obtaining a setting for an uplink power control parameter, to be used by a wireless device for transmitting an uplink message to a second radio network node that is serving the wireless device in conjunction with the first radio network node;
   obtaining mapping information that associates different settings of the uplink power control parameter to different resources of a physical downlink control channel region;
   using the mapping information to identify the resource of the downlink control channel region that is associated with the setting obtained for the uplink power control parameter;
   configuring the wireless device to use the identified setting of the uplink power control parameter, by using the identified resource to transmit a downlink control message to the wireless device, wherein the wireless device has knowledge of the mapping information.

8. The method according to claim 7, wherein the resources of the physical downlink control channel region are physical resource block sets of an enhanced physical downlink control channel, ePDCCH, in an evolved universal terrestrial radio access network, E-UTRAN, and wherein the uplink power control parameter is used by the wireless device to control uplink transmission power for at least one of Physical Uplink Control Channel transmissions, Physical Uplink Shared Channel transmissions, and Sounding Reference Signal transmissions.

9. The method according to claim 7, wherein the wireless device has knowledge of the mapping information based on the method further comprising transmitting the mapping information to the wireless device in a configuration message.

10. The method according to claim 7, wherein obtaining the mapping information comprises receiving the mapping information from another network node in a configuration message.

11. A wireless device configured for operation in a radio communications system, the wireless device comprising:
    a radio circuitry configured to receive downlink signals from one or more radio network nodes and to transmit uplink signals to one or more radio network nodes; and
    processing circuitry operatively associated with the radio circuitry and configured to:
       maintain mapping information that associates different settings of an uplink power control parameter with different resources of a physical downlink control channel region;
       receive a downlink control message on a resource of the physical downlink control channel region, the downlink control message being received from a first radio network node serving the wireless device in conjunction with a second radio network node;
       use the mapping information to identify the setting of the uplink power control parameter that is associated with the resource on which the downlink control message was received; and transmit an uplink message for the second radio network node, using an uplink transmission power determined in dependence on the identified setting of the uplink power control parameter.

12. A radio network node configured for operation in a radio communications system, the radio network node comprising:

radio circuitry configured to transmit downlink signals to wireless devices and to receive uplink signals from wireless devices;

processing circuitry operatively associated with the radio circuitry and configured to:

obtain a setting for an uplink power control parameter, to be used by a wireless device for transmitting an uplink message to a second radio network node that is serving the wireless device in conjunction with the first radio network node;

obtain mapping information that associates different settings of the uplink power control parameter to different resources of a physical downlink control channel region;

use the mapping information to identify the resource of the downlink control channel region that is associated with the setting obtained for the uplink power control parameter;

configure the wireless device to use the identified setting of the uplink power control parameter, by using the identified resource to transmit a downlink control message to the wireless device, wherein the wireless device has knowledge of the mapping information.

* * * * *